(12) United States Patent
Chang et al.

(10) Patent No.: US 7,750,905 B2
(45) Date of Patent: Jul. 6, 2010

(54) METHOD FOR CONSTRUCTING A TRIANGULAR MESH SURFACE OF A POINT CLOUD

(75) Inventors: Chih-Kuang Chang, Taipei Hsien (TW); Xin-Yuan Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 582 days.

(21) Appl. No.: 11/765,458

(22) Filed: Jun. 20, 2007

(65) Prior Publication Data

US 2008/0117208 A1    May 22, 2008

(30) Foreign Application Priority Data

Nov. 17, 2006    (CN) .................... 2001 1 0156911

(51) Int. Cl.
*G06T 17/20* (2006.01)
*G06T 15/00* (2006.01)
(52) U.S. Cl. ...................... 345/423; 345/419
(58) Field of Classification Search ........ None
See application file for complete search history.

(56) References Cited

U.S. PATENT DOCUMENTS

| | | | |
|---|---|---|---|
| 6,392,647 B1 * | 5/2002 | Migdal et al. .......... | 345/423 |
| 6,545,676 B1 * | 4/2003 | Ryan et al. ........... | 345/423 |
| 7,023,432 B2 | 4/2006 | Fletcher et al. | |
| 7,352,369 B2 * | 4/2008 | Spicer et al. .......... | 345/420 |
| 7,420,555 B1 * | 9/2008 | Lee ................... | 345/424 |
| 2003/0067461 A1 * | 4/2003 | Fletcher et al. ........ | 345/420 |
| 2004/0051711 A1 * | 3/2004 | Dimsdale et al. ....... | 345/419 |

OTHER PUBLICATIONS

H. Woo, E. Kang, Semyung Wang, Kwan H. Lee, A new segmentation method for point cloud data, International Journal of Machine Tools and Manufacture, vol. 42, Issue 2, Jan. 2002, pp. 167-178.*

* cited by examiner

*Primary Examiner*—Daniel F Hajnik
(74) *Attorney, Agent, or Firm*—Frank R. Niranjan (57) ABSTRACT

A method for constructing a triangular mesh surface of a point cloud is disclosed. The method includes: (a) inputting point cloud data; (b) determining a cubical figure that confines the point cloud, mapping a grid on the cubical figure to obtain a plurality of grid squares; (c) acquiring a point that has not constructed any triangle with other points as a first point of a triangle; (d) acquiring the point nearest to the first point in the grid squares surrounding the first point as a second point of the triangle; (e) obtaining a midpoint of the first point and the second point, and constructing a triangle by utilizing the first point, the second point and a point in the grid squares surrounding the midpoint; and (f) repeating from (c) to (e) for each point to construct a triangle, and outputting a triangular mesh surface of the point cloud.

5 Claims, 9 Drawing Sheets

METHOD FOR CONSTRUCTING A TRIANGULAR MESH SURFACE OF A POINT CLOUD

BACKGROUND OF THE INVENTION

1. Field of the Invention

The present invention generally relates to methods for constructing a mesh surface of a point cloud, and more particularly, to a method for constructing a triangular mesh surface of a point cloud.

2. Description of Related Art

Figure 1:
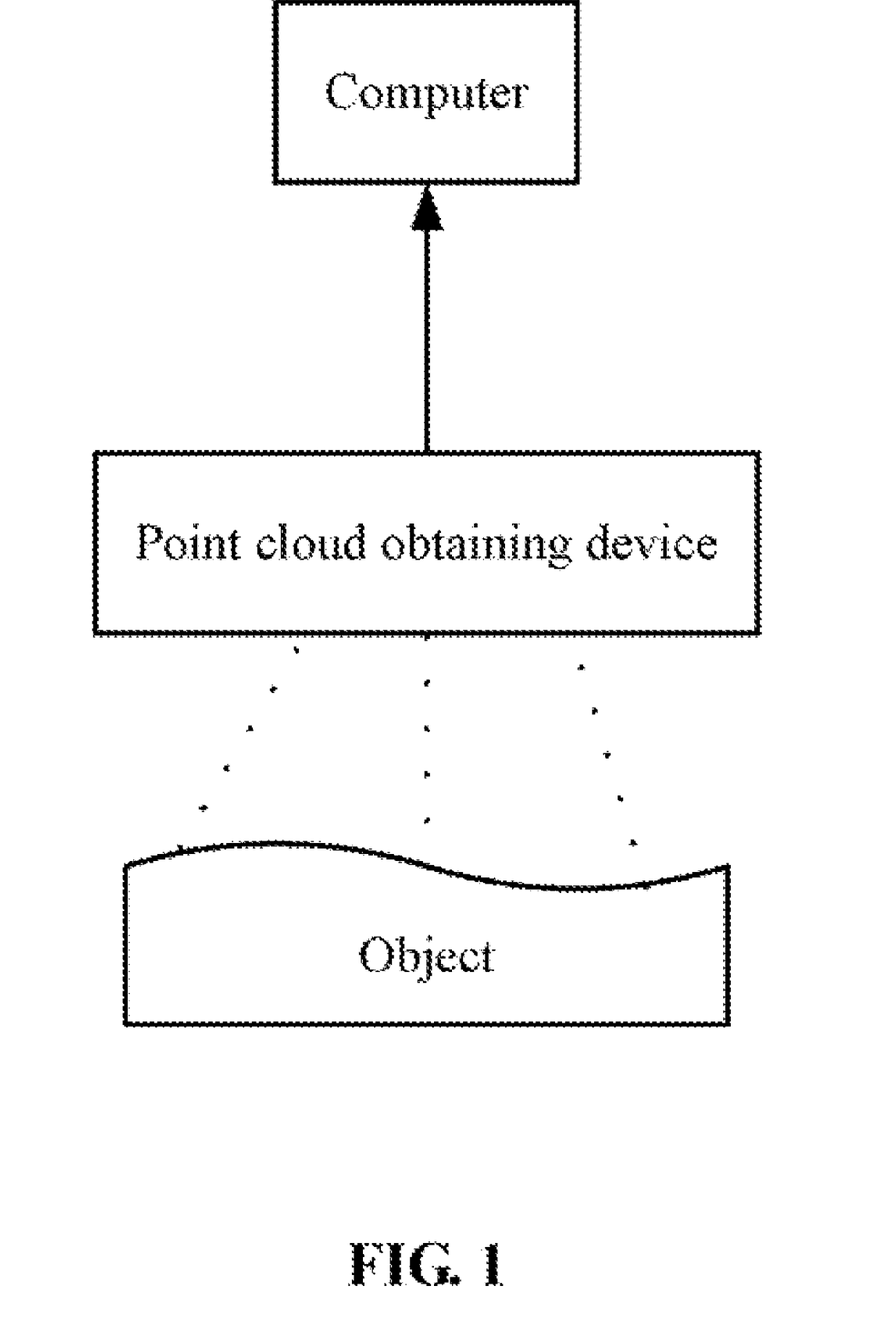
FIG. 1 is a schematic diagram of hardware configuration and an application environment of a scanning system.

In recent years, with performances of computer hardware and software continually improving, computers play a major role in a scanning system (referring to FIG. 1). The scanning system generally includes: a point cloud obtaining device for obtaining point cloud data of an object and inputting the point cloud data to a computer; a computer for executing software to process the point cloud data, such as CAV (Computer Aided Verification), RE (Reverse Engineering), and so forth.

Constructing a mesh surface of a point cloud is a key problem in the above processes. In general, a mesh of a point cloud can be triangular, quadrangular or polygonal, in which a triangular mesh approximates (both locally and globally) the object with the highest-accuracy.

Delaunay is the most famous in current techniques of constructing a triangular mesh surface of a point cloud. Even though Delaunay discloses how to construct a triangular mesh surface of a point cloud, it leads to many calculations. As a result, convenience and flexibility are undoubtedly decreased and it is difficult, complex and time-consuming for Delaunay to offer a robust solution to the above problem.

What is needed, therefore, is a method which can construct a triangular mesh surface of a point cloud, for reducing complexity of calculations and enhancing work efficiency.

SUMMARY OF THE INVENTION

A preferred embodiment provides a method for constructing a triangular mesh surface of a point cloud. The method includes: (a) inputting point cloud data obtained by a point cloud obtaining device and a tolerance of the triangular mesh surface to be constructed to the computer; (b) determining a cubical figure that confines the point cloud, mapping a grid on the cubical figure to obtain a plurality of grid squares, and putting an ID of each point of the point cloud into a corresponding grid square; (c) acquiring a point that has not constructed any triangle with other points of the point cloud as a first point of a triangle; (d) obtaining grid squares surrounding the first point, and acquiring the point nearest to the first point in the grid squares surrounding the first point as a second point of the triangle; (e) obtaining a midpoint of the first point and the second point, obtaining grid squares surrounding the midpoint, and constructing the triangle by utilizing the first point, the second point and a point in the grid squares surrounding the midpoint; and (f) repeating the steps from (c) to (e) for each point of the point cloud to construct a triangle, and outputting the triangular mesh surface of the point cloud that is constructed by all the triangles.

Other advantages and novel features of the present invention will become more apparent from the following detailed description of preferred embodiments when taken in conjunction with the accompanying drawings.

DETAILED DESCRIPTION OF THE INVENTION

Figure 2:
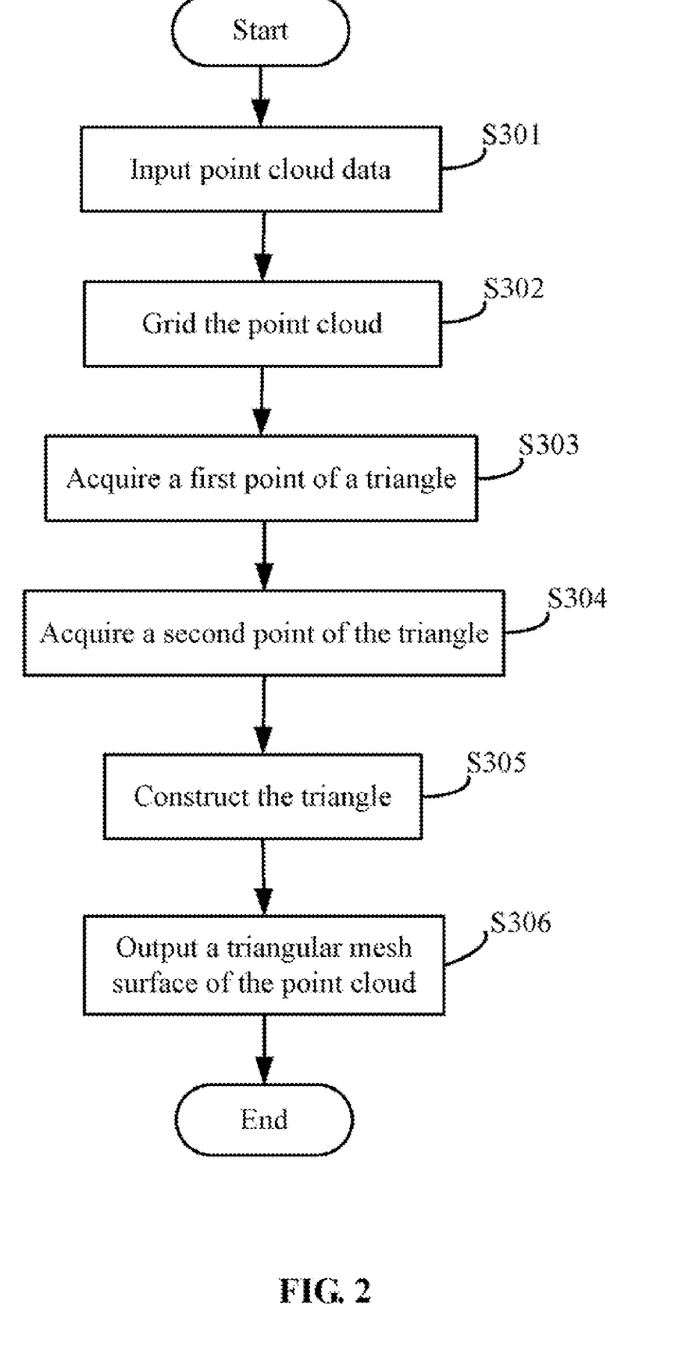
FIG. 2 is a flow chart of a preferred method for constructing a triangular mesh surface of a point cloud by utilizing the scanning system of FIG. 1.

FIG. 2 is a flow chart illustrating a method for constructing a triangular mesh surface of a point cloud by utilizing the scanning system of FIG. 1.

In step S301, data of a point cloud (hereinafter "point cloud data") obtained by the point cloud obtaining device are being inputted to the computer. Then, a user sets a tolerance of a triangular mesh surface of the point cloud to be constructed in the computer. The point cloud data may include coordinates of each point, an ID of each point, and a total number of the points in the point cloud.

In step S302, the computer grids the point cloud. Specifically, the computer determines a cubical figure that confines the point cloud, maps a grid on the cubical figure to obtain a plurality of grid squares, and puts the ID of each point of the point cloud into a corresponding grid square (details are described in FIG. 3).

In step S303, the computer acquires a first point of a triangle. In detail, if a point has not constructed any triangle with other points of the point cloud, the point can be acquired as the first point.

Figure 4:
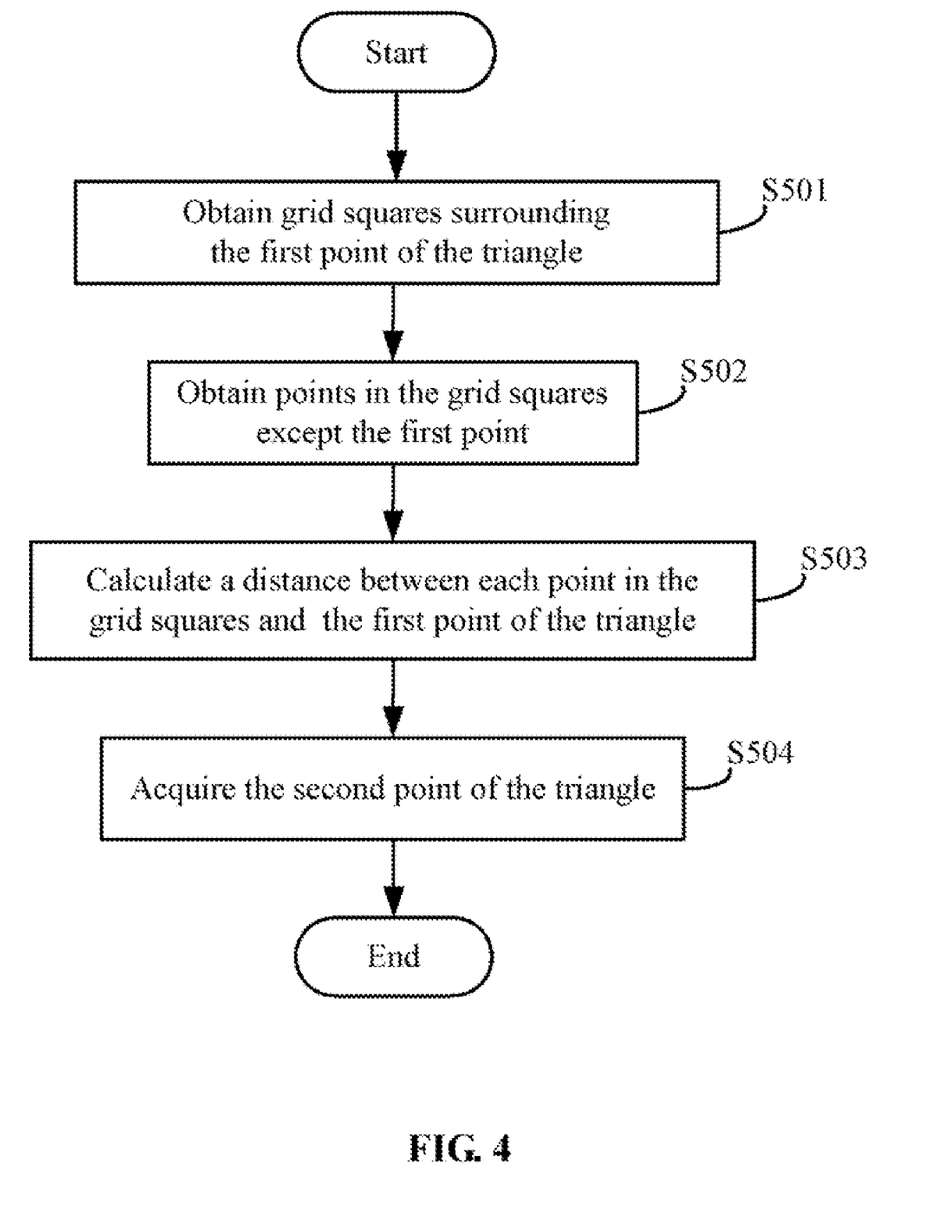
FIG. 4 is a flow chart of details of step S304 of FIG. 2.

In step S304, the computer obtains grid squares surrounding the first point, and acquires the point nearest to the first point in the grid squares surrounding the first point as a second point of the triangle (details are described in FIG. 4).

Figure 5:
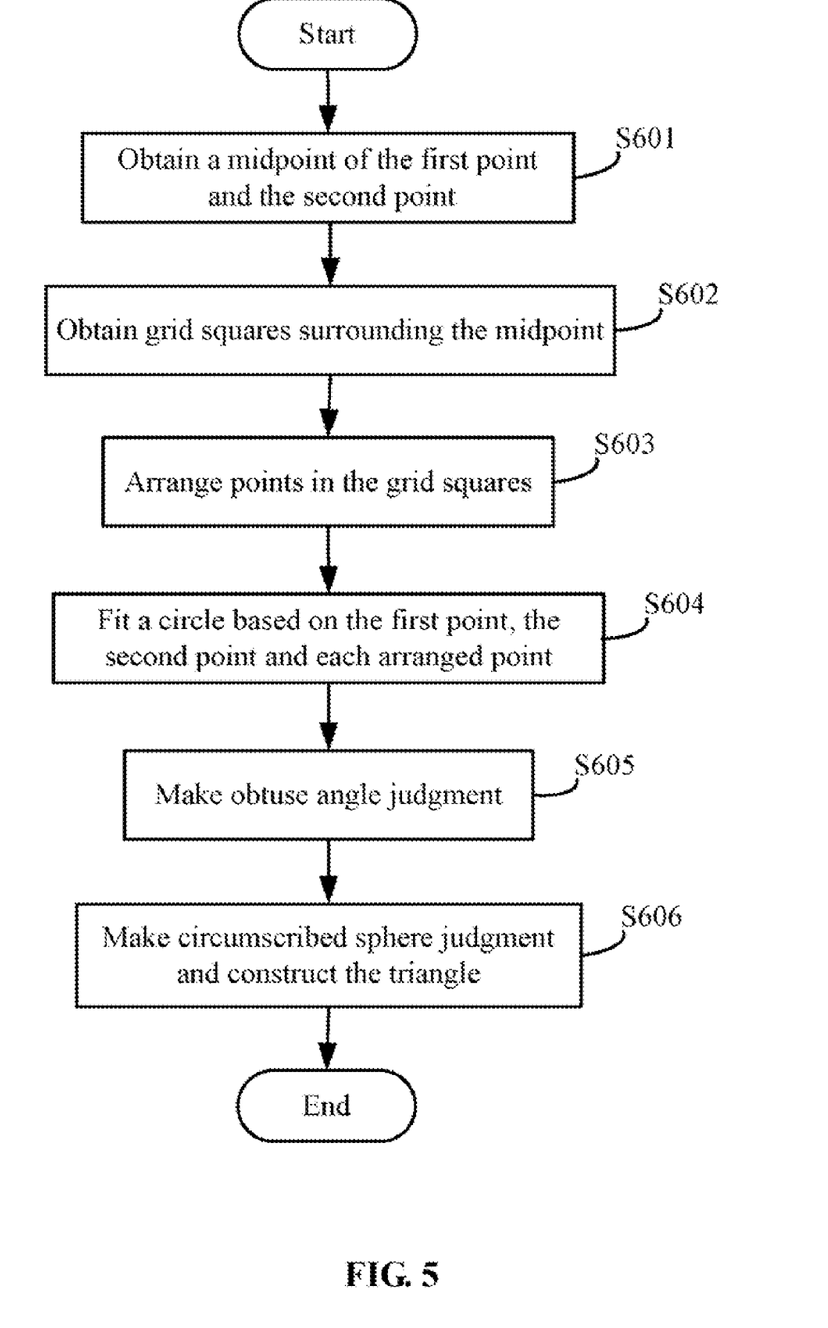
FIG. 5 is a flow chart of details of step S305 of FIG. 2.

In step S305, the computer obtains a midpoint of the first point and the second point, obtains grid squares surrounding the midpoint, and constructs the triangle by utilizing the first point, the second point and a point in the grid squares surrounding the midpoint (details are described in FIG. 5).

In step S306, the computer repeats the steps from S303 to step S305 for each point of the point cloud, so that all the triangles of the point cloud are constructed. Finally, the computer outputs the triangular mesh surface of the point cloud that is constructed by all the above triangles.

Figure 3:
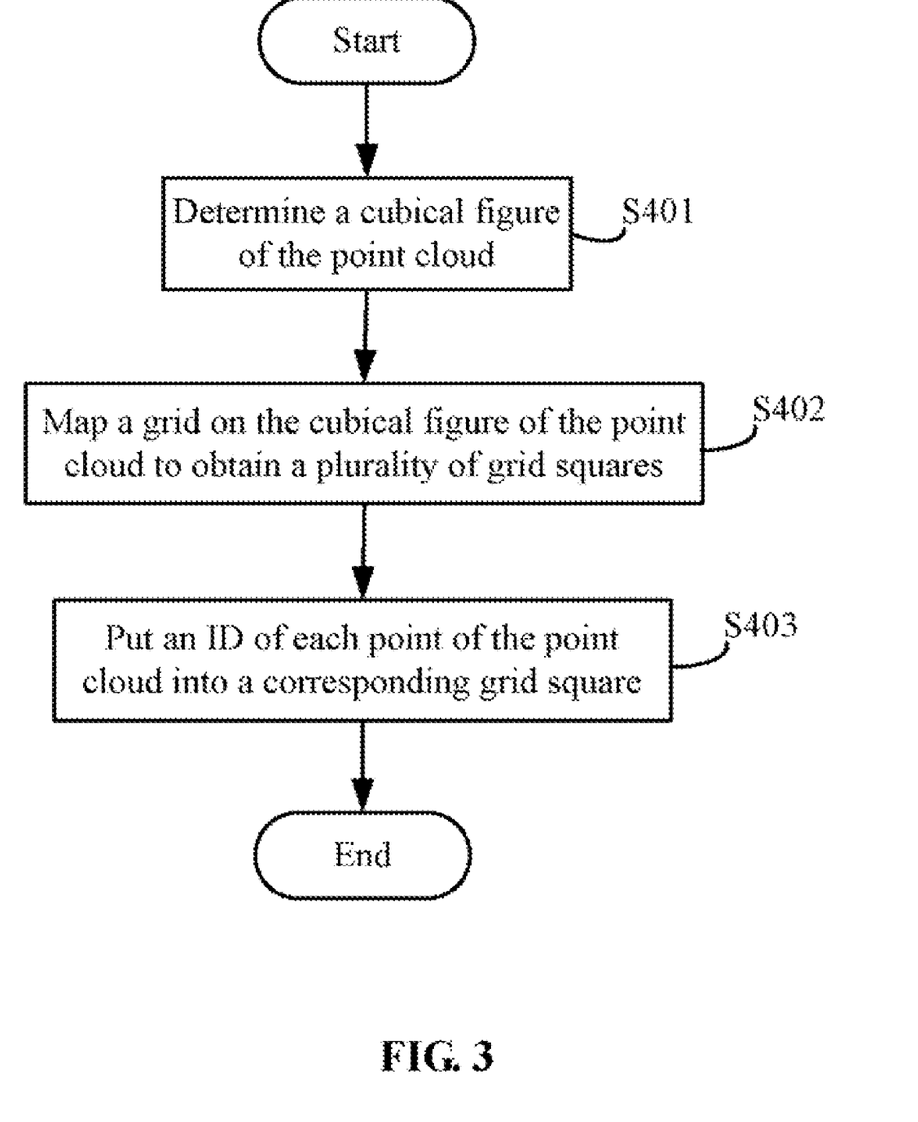
FIG. 3 is a flow chart of details of step S302 of FIG. 2.

FIG. 3 is a flow chart of details of step S302.

In step S401, the computer determines a cubical figure of the point cloud. Firstly, the computer identifies the outermost point on each of surface edges of the point cloud by analyzing coordinates of the outermost point on each of the surface edges of the point cloud. Generally, the point cloud consists of a plurality of points. The computer compares coordinates of all the points of the point cloud recursively and obtains the outermost points of the point cloud. Secondly, the computer determines the cubical figure that confines the point cloud. Thirdly, the computer obtains a length, a width and a height of the cubical figure.

In step S402, the computer maps a grid on the cubical figure according to the length, the width, the height of the cubical figure, the total number of the points, and the tolerance set by the user. Specifically, the computer computes a side length of each grid square based on the length, the width, the height of the cubical figure, the total number of the points, and the tolerance, and then grids the cubical figure with the plurality of grid squares according to the side length of each grid square.

In step S403, the computer puts an ID of each point into a corresponding grid square according to coordinates of the point.

FIG. 4 is a flow chart of details of step S304.

In step S501, the computer obtains grid squares surrounding the first point according to an ID of the first point, the tolerance, and the side length computed.

In step S502, the computer obtains points in the grid squares except the first point.

In step S503, the computer calculates a distance between each point in the grid squares and the first point of the triangle.

In step S504, the computer acquires the point having the smallest distance from the first point as the second point of the triangle. In other words, the second point is the point that is nearest to the first point.

FIG. 5 is a flow chart of details of step S305.

In step S601, the computer obtains a midpoint of the first point and the second point.

In step S602, the computer obtains grid squares surrounding the midpoint according to an ID of the midpoint, the tolerance, and the side length (referring to step S501).

In step S603, the computer arranges points in the grid squares. In detail, firstly the computer draws one ray extending from each point in the grid squares and passing through the first point, another ray extending from the same point and passing through the second point; secondly the computer obtains each angle between each couple of the above rays; thirdly the computer arranges the points in a descending sequence according to the angles obtained.

In step S604, the computer fits a circle based on the first point, the second point and each arranged point according to the sequence, and then judges whether a diameter of each circle is greater than the tolerance. If the diameter is greater than the tolerance, the point is skipped and the computer continues judging a next point in the sequence; otherwise, if the diameter is not greater than the tolerance, the procedure goes directly to step S605 described below.

For a convenient description of the preferred embodiment, here we assume the first point as pt1, the second point as pt2, and a point to be judged as pt3'.

In step S605, the computer makes obtuse angle judgment. Specifically, the computer judges whether sides of the triangle pt1pt2pt3' have been used to construct any triangle with any other point of the point cloud. If none of the sides (pt1pt2, pt2pt3', pt1pt3') have been used to construct any triangle with any other point of the point cloud, the procedure goes directly to step S606 described below. Otherwise, the computer continues to judge whether an angle between a triangle constructed by one of the sides and the triangle pt1pt2pt3' is obtuse. If the angle is not obtuse, the point pt3' is skipped and the computer continues judging a next point in the sequence; otherwise, if the angle is obtuse, the procedure goes directly to step S606 described below.

In step S606, the computer makes circumscribed sphere judgment and constructs the triangle. Specifically, the computer fits a circumscribed sphere based on pt1, pt2, and pt3', and then judges the circumscribed sphere (details are described in FIG. 6).

Figure 6:
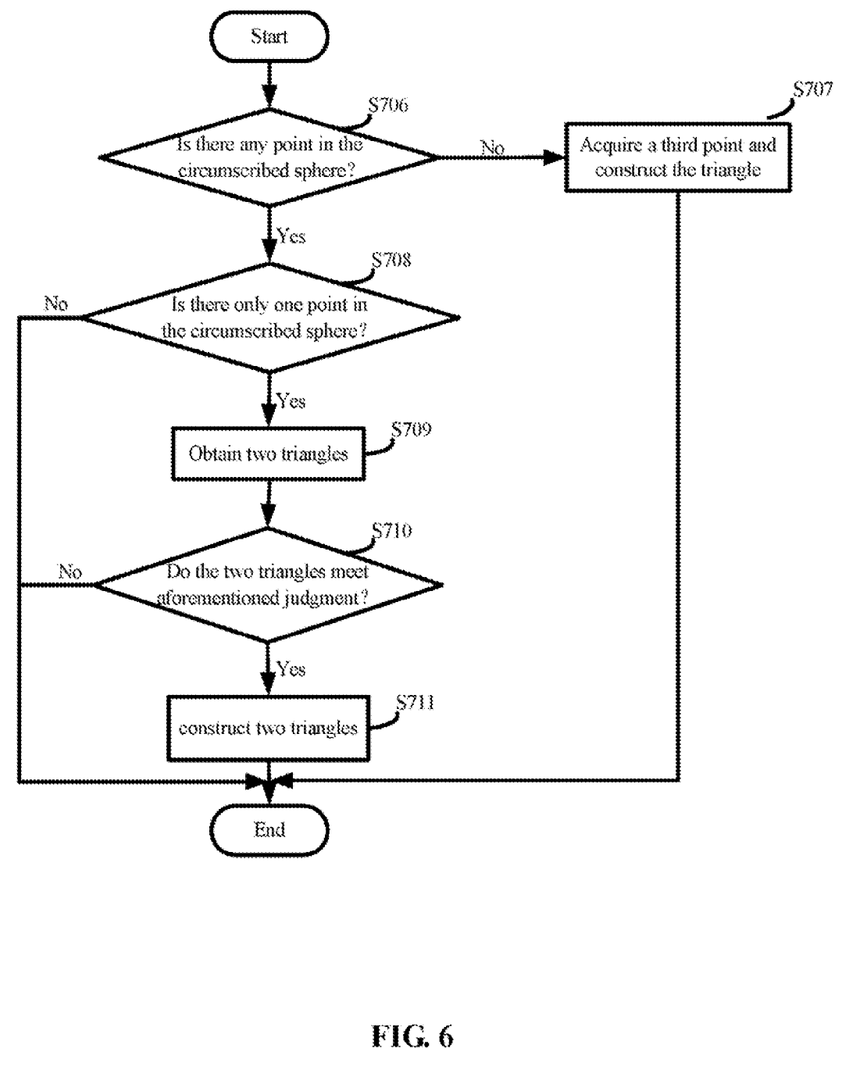
FIG. 6 is a flow chart of details of step S606 of FIG. 5.

FIG. 6 is a flow chart of details of step S606.

In step S706, the computer obtains a center of the circumscribed sphere, and obtains grid squares surrounding the center (referring to step S501). The computer computes a distance between each point in the gird squares and the center, and judges whether there is any point in the circumscribed sphere by comparing a semidiameter of the circumscribed sphere and each distance computed.

If the distance is greater than the semidiameter, which means there is no point in the circumscribed sphere, in step S707, the computer acquires the point pt3' as a third point, and constructs the triangle pt1pt2pt3' based on the first point pt1, the second point pt2 and the third point pt3'.

Otherwise, if the distance is not greater than the semidiameter, which means there is point in the circumscribed sphere, then in step S708, the computer judges whether there is only one point in the circumscribed sphere. If there is more than one point in the circumscribed sphere, the point is skipped and the computer continues judging a next point in the sequence.

Figure 7:
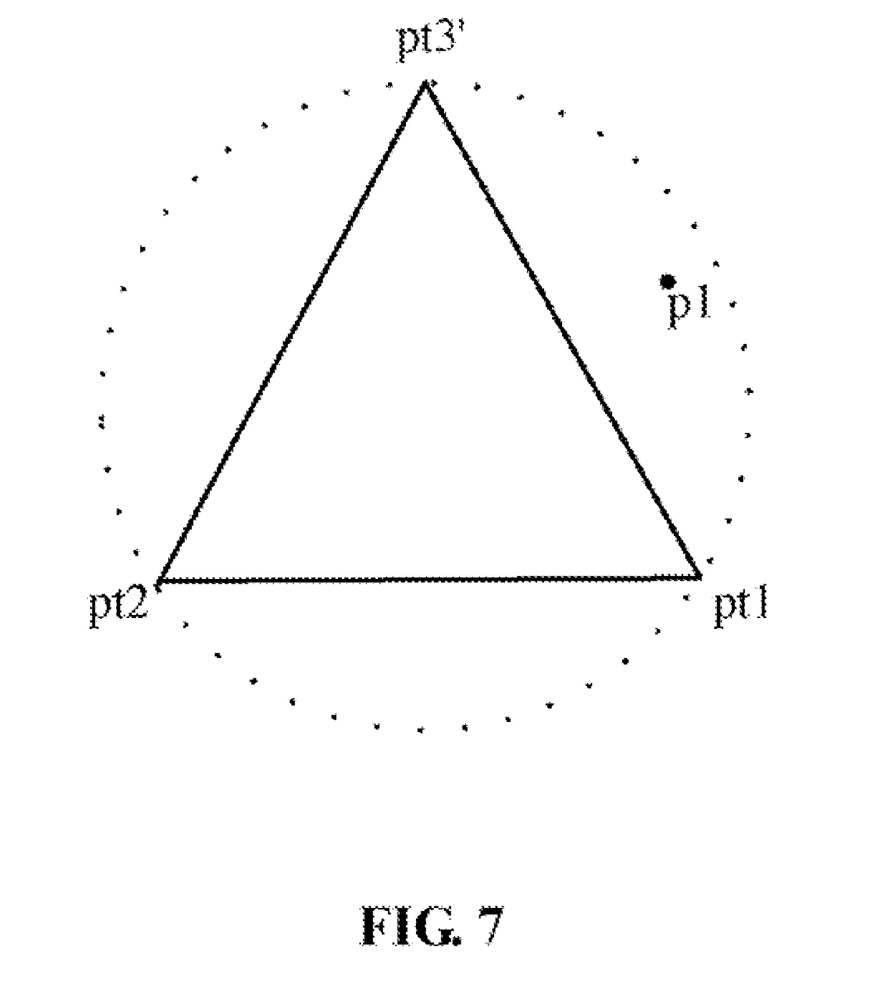
FIGS. 7-9 illustrate an example of progressive steps to construct triangles.
Figure 8:
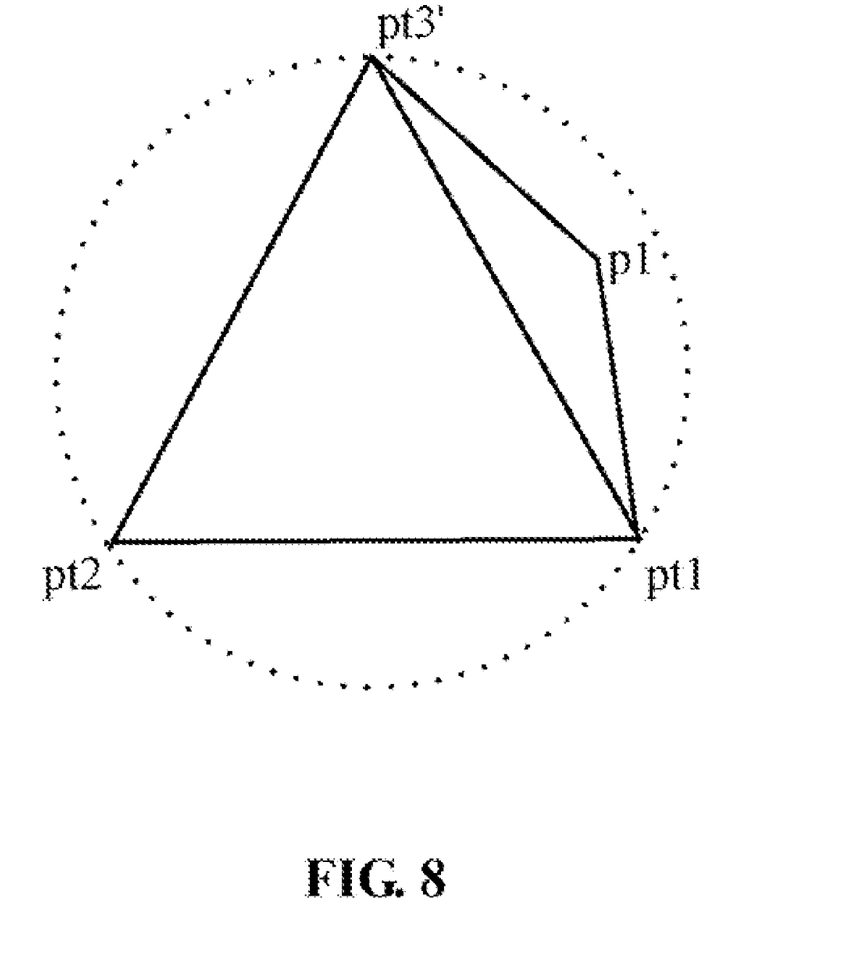
Figure 9:
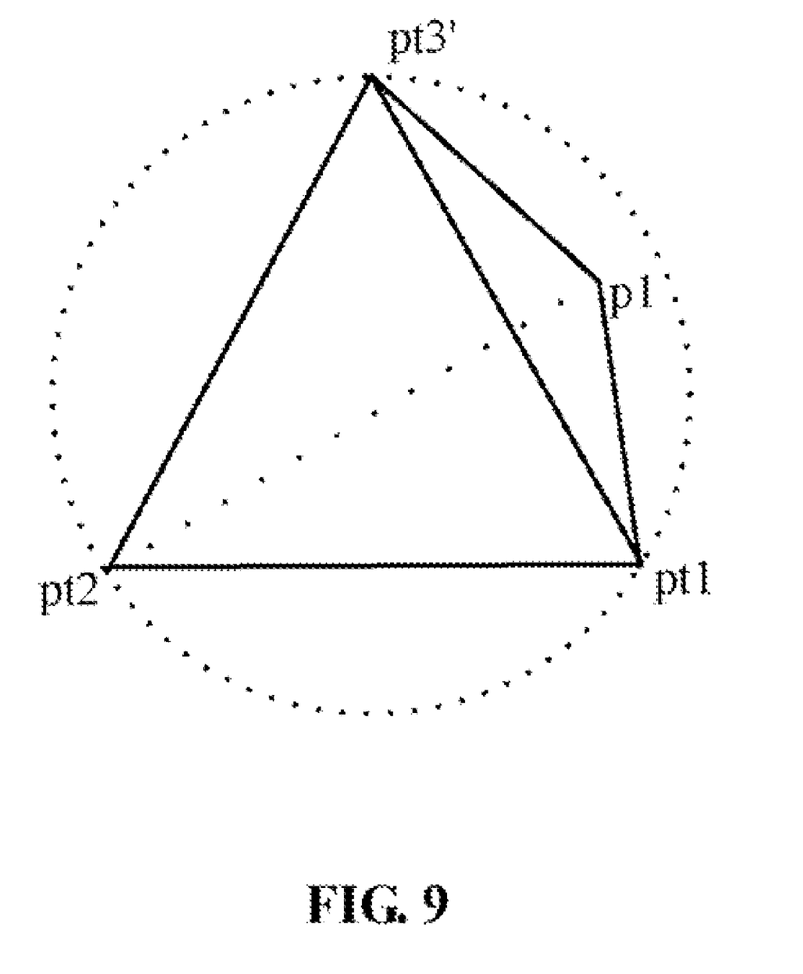

Otherwise, if there is only one point (taking p1 for example in FIG. 7) in the circumscribed sphere, in step S709, the computer connects p1pt3' and p1 pt1 in order to form a quadrangle p1pt1pt2pt3' (referring to FIG. 8). Then the computer connects p1pt2, so as to divide the quadrangle into two triangles: triangle p1pt2pt3' and triangle p1pt2pt1 (referring to FIG. 9).

In step S710, the computer judges whether the two triangles meet aforementioned judgment. Specifically, the computer firstly fits circumscribed spheres respectively for the triangle p1pt2pt3' and the triangle p1pt2pt1 and makes circumscribed sphere judgment (referring to step S606); and secondly makes obtuse angle judgment (referring to step S605).

If each of the two triangles (the triangle p1pt2pt3' and the triangle p1pt2pt1) meets the aforementioned judgment, in step S711, the computer constructs two triangles: the triangle p1pt2pt3' and the triangle p1pt2pt1; otherwise, if any of the two triangles can't meet the aforementioned judgment, the point pt3' is skipped and the computer continues judging a next point in the sequence.

Although the present invention has been specifically described on the basis of a preferred embodiment and a preferred method, the invention is not to be construed as being limited thereto. Various changes or modifications may be made to said embodiment and method without departing from the scope and spirit of the invention.

What is claimed is:

1. A computer-based method for constructing a triangular mesh surface of a point cloud, the method comprising:
   (a) inputting point cloud data obtained by a point cloud obtaining device and a tolerance of the triangular mesh surface to be constructed to the computer;
   (b) determining a cubical figure that confines the point cloud, mapping a grid on the cubical figure to obtain a plurality of grid squares, and putting an ID of each point of the point cloud into a corresponding grid square;
   (c) acquiring a point that has not constructed any triangle with other points of the point cloud as a first point of a triangle;
   (d) obtaining grid squares surrounding the first point, and acquiring the point nearest to the first point in the grid squares surrounding the first point as a second point of the triangle;
   (e) obtaining a midpoint of the first point and the second point, obtaining grid squares surrounding the midpoint, and constructing the triangle by utilizing the first point, the second point and a point in the grid squares surrounding the midpoint; and
   wherein the step (e) comprises:
   arranging points in the grid squares surrounding the midpoint;
   determining whether each arranged point meets a first condition by fitting a circle based on the first point, the second point and the arranged point, wherein the first condition is that a diameter of each circle is greater than the tolerance;

making obtuse angle judgment to confirm whether each point satisfying the first condition meets a second condition according to a triangle based on the first point, the second point and the point satisfying the first condition, wherein the second condition is sides of the triangle have not been used to construct any triangle with any other point of the point cloud, or an angle between a triangle constructed by one of the sides and the triangle is obtuse;

making circumscribed sphere judgment for each point satisfying the second condition by fitting a circumscribed sphere based on the first point, the second point and the point satisfying the second condition;

(f) repeating the steps from (c) to (e) for each point of the point cloud to construct a triangle, and outputting the triangular mesh surface of the point cloud that is constructed by all the triangles.

2. The method according to claim 1, wherein the point cloud data comprise coordinates of each point, an ID of each point, and a total number of the points.

3. The method according to claim 1, wherein the step (d) comprises:

obtaining grid squares surrounding the first point;

obtaining points in the grid squares except the first point;

calculating a distance between each point in the grid squares and the first point; and acquiring the point having the smallest distance from the first point as the second point of the triangle.

4. The method according to claim 1, wherein the step of making circumscribed sphere judgment comprises: determining whether there is any point in the circumscribed sphere; determining whether there is only one point in the circumscribed sphere, if there is any point in the circumscribed sphere;

if there is only one point in the circumscribed sphere, obtaining two triangles from a quadrangle based on the only one point, the first point, the second point and the point satisfying the second condition; making circumscribed sphere judgment for the two triangles, and determining whether the two triangles meet the second condition; constructing two triangles, if the two triangles meet the circumscribed sphere judgment and the second condition.

5. The method according to claim 4, further comprising:

acquiring the point satisfying the second condition as a third point of the triangle and constructing the triangle based on the first point, the second point and the third point, if there is no point in the circumscribed sphere.

* * * * *